(12) United States Patent

Grover et al.

(10) Patent No.: US 12,625,994 B2
(45) Date of Patent: May 12, 2026

(54) TYING ACCESS/REDACTION TO AUTHENTICATION LEVELS

(71) Applicant: MICRO FOCUS LLC, Wilmington, DE (US)

(72) Inventors: Douglas Max Grover, Rigby, ID (US); Michael F. Angelo, Houston, TX (US)

(73) Assignee: Micro Focus LLC, Austin, TX (US)

( * ) Notice: Subject to any disclaimer, the term of this patent is extended or adjusted under 35 U.S.C. 154(b) by 69 days.

(21) Appl. No.: 18/585,545

(22) Filed: Feb. 23, 2024

(65) Prior Publication Data

US 2025/0272419 A1     Aug. 28, 2025

(51) Int. Cl.
*G06F 21/62*         (2013.01)
*H04L 9/40*          (2022.01)

(52) U.S. Cl.
CPC .......... *G06F 21/6218* (2013.01); *H04L 63/08* (2013.01); *H04L 63/105* (2013.01)

(58) Field of Classification Search
CPC .... G06F 21/6218; H04L 63/08; H04L 63/105
See application file for complete search history.

(56) References Cited

U.S. PATENT DOCUMENTS

| | | | |
|---|---|---|---|
| 5,315,658 A | 5/1994 | Micali | |
| 6,026,163 A | 2/2000 | Micali | |

| | | | | | |
|---|---|---|---|---|---|
| 8,683,602 | B2 * | 3/2014 | Waller | .................... | G06F 21/10 |
| | | | | | 380/278 |
| 8,869,299 | B2 * | 10/2014 | Charbonneau | .......... | G06F 21/64 |
| | | | | | 726/28 |
| 9,965,645 | B2 * | 5/2018 | Sinor | ..................... | H04L 63/08 |
| 10,296,751 | B2 * | 5/2019 | Boudreau | ........... | H04L 63/0227 |
| 10,671,758 | B2 * | 6/2020 | Joisha | ................. | G06F 11/0778 |
| 10,891,373 | B2 * | 1/2021 | Humphries | ........... | G06N 20/00 |
| 11,297,052 | B1 * | 4/2022 | Voss | ...................... | H04L 63/104 |
| 2010/0229246 | A1 * | 9/2010 | Warrington | ......... | G06F 21/6218 |
| | | | | | 726/28 |
| 2011/0040967 | A1 * | 2/2011 | Waller | .................... | G06F 21/10 |
| | | | | | 713/160 |
| 2015/0089663 | A1 * | 3/2015 | Gile | .................... | G06F 21/6218 |
| | | | | | 726/27 |
| 2019/0065780 | A1 * | 2/2019 | Joisha | ................. | G06F 11/0778 |
| 2021/0110107 | A1 * | 4/2021 | Wright | ................... | H04L 63/08 |
| 2024/0078337 | A1 * | 3/2024 | Kamyshenko | ...... | G06F 21/6245 |

* cited by examiner

*Primary Examiner* — Oleg Korsak
(74) *Attorney, Agent, or Firm* — Sheridan Ross P.C.

(57) ABSTRACT

A media is created. The media may be a document, an image, a video file, an audio file, a real-time communication session, an email, a chat session, and/or the like. The media is associated with a plurality of authentication levels. For example, the media may use a first authentication level that requires a username/password and a second authentication level that requires a fingerprint scan of a user. The media is created based on a security process according to the plurality of authentication levels. For example, the security process may be an encryption process and/or a tokenization process. The media is divided into a plurality of sections based on the plurality of authentication levels. The security process is applied to the plurality of sections based on the plurality of authentication levels.

20 Claims, 7 Drawing Sheets

TYING ACCESS/REDACTION TO AUTHENTICATION LEVELS

FIELD

The disclosure relates generally to multi-level authentication and particularly to managing how information is accessed and redacted using multi-level authentication.

BACKGROUND

Access to sensitive information is not always properly controlled. For example, data that does not have fine controls on access may allow a user, who should not have access to data, to be able to gain access to sensitive information. Alternatively, users who need access cannot get access to some types of sensitive information because the controls are not fine grained enough.

SUMMARY

These and other needs are addressed by the various embodiments and configurations of the present disclosure. The present disclosure can provide a number of advantages depending on the particular configuration. These and other advantages will be apparent from the disclosure contained herein.

A media is created. The media may be a document, an image, a video file, an audio file, a real-time communication session, an email, a chat session, and/or the like. The media is associated with a plurality of authentication levels. For example, the media may use a first authentication level that requires a username/password and a second authentication level that requires a fingerprint scan of a user. The media is created based on a security process according to the plurality of authentication levels. For example, the security process may be an encryption process and/or a tokenization process. The media is divided into a plurality of sections based on the plurality of authentication levels. The security process is applied to the plurality of sections based on the plurality of authentication levels.

In a second embodiment, the media is retrieved. The media is associated with the plurality of authentication levels. The media is created based on the security process according to the plurality of authentication levels. A current authentication level of a user is retrieved. Sections of the media that the user can access based on the current authentication level of the user are determined. The sections of the media that the user can access based on the current authentication level of the user are displayed to the user. Sections of the media that the user cannot access based the current authentication level of the user are not displayed or are redacted.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As defined herein a "media" may be any type of user information that can be stored and/or communicated, such as an email, a document, a database, a spreadsheet, a voice communication session, a video communication session, a text message, a chat, a Short Message Service (SMS) text, an image, and/or the like.

As described herein an in the claims the term "creating a media" or similar language may include modifying an existing media, creating a new media, establishing a communication session, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
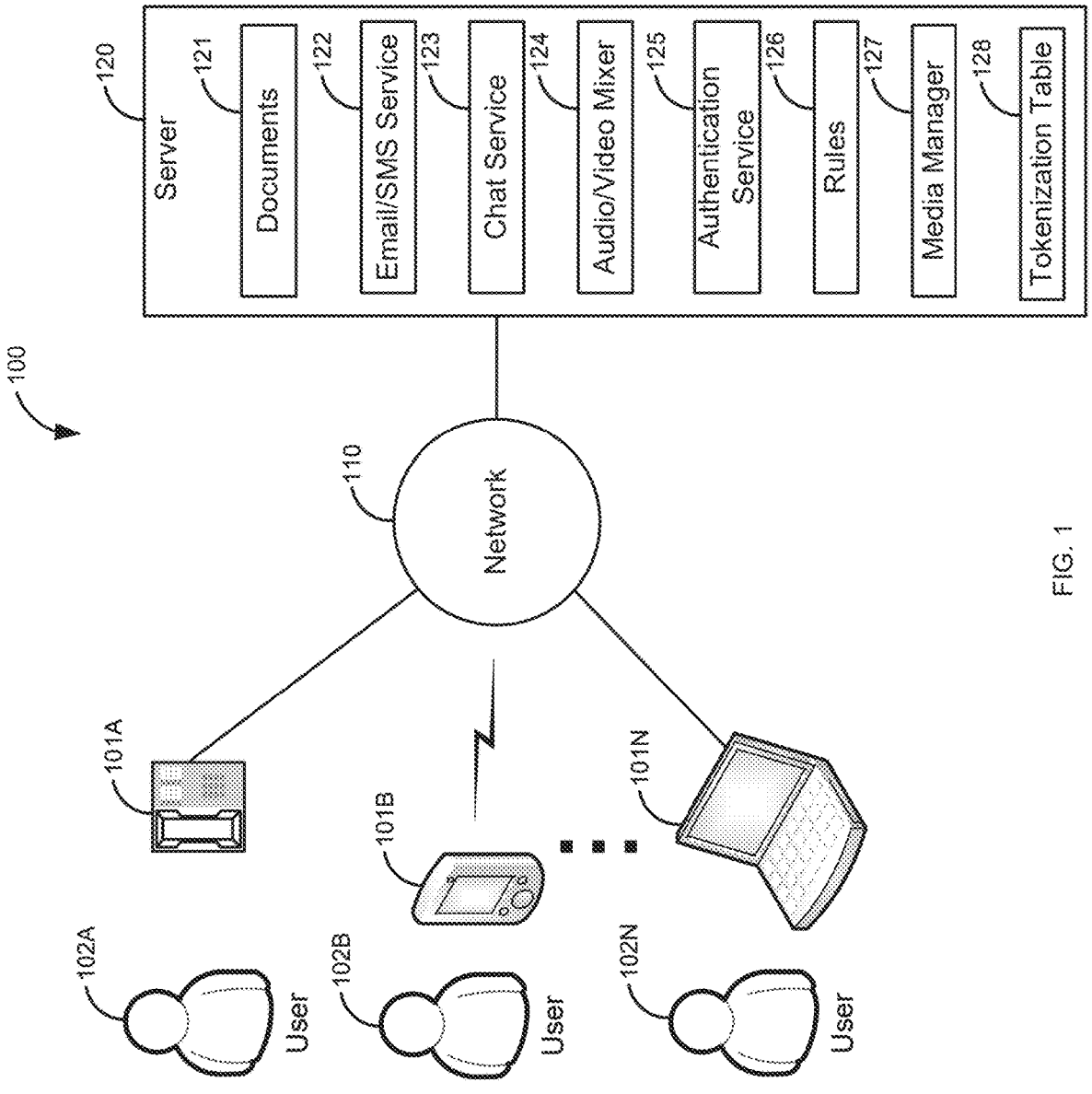
FIG. 1 is a block diagram of a first illustrative system for tying access/redaction to authentication levels.

FIG. 1 is a block diagram of a first illustrative system 100 for tying access/redaction to authentication levels. The first illustrative system 100 comprises communication devices 101A-101N, a network 110, and a server 120. In addition, users 102A-102N are shown for convenience.

The communication devices 101A-101N can be or may include any user device that can communicate on the network 110, such as a Personal Computer (PC), a telephone, a video system, a cellular telephone, a Personal Digital Assistant (PDA), a tablet device, a notebook device, a smartphone, a laptop computer, a smart watch, and/or the like. As shown in FIG. 1, any number of communication devices 101A-101N may be connected to the network 110, including only a single communication device 101.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any device that can manage media, such as a web server, a database server, an email server, a document repository, a Short Message Service (SMS) server, a chat service 123, an audio/video communication system, and/or the like. The server 120 further comprises documents 121, an email/SMS server 122, a chat server 123, an audio/video mixer 124, an authentication service 125, rules 126, a media manager 127, and a tokenization table 128.

The server 120 may comprise a subset of the elements 121-127. For example, the server 120 may be a document server 120 that comprises the elements 121, and 125-128. Alternatively, some of the elements 121-128 may reside on multiple devices on the network 110.

The documents 121 (a type of media) may be any type of documents 121, such as text documents, spreadsheet documents, Portable Document Format (PDF) documents, images, presentation documents, stored email messages, and/or the like. The documents 121 may be the same type of documents 121 or various kinds of different types of documents 121.

The email/SMS service 122 may be any hardware coupled with software that can provide email/SMS services, such as, an Exchange server, a Groupwise® server, a cellular service, and/or the like. The email/SMS service 122 may be two separate services that individually provide email and SMS separately. The email/SMS service 122 may provide email/SMS services to the communication devices 101A-101N/ users 102A-102N.

The chat service 123 may be any service or portion of a service that provides chat services. The chat service 123 may be part of another service that provides other services, such as video conferencing (e.g., as done in Microsoft Teams®).

The audio/video mixer 124 may be any service that provides real-time audio and/or video communications, such as a Private Branch Exchange (PBX), a cellular switch, a central office switch, a video communication/conferencing system, and/or the like.

The authentication service 125 may be any service that provides multi-level authentication for the users 102A-102N. The authentication service 125 may use various authentication credentials to authenticate the user 102A-102N at different authentication levels, such as a username/password, a fingerprint scan, an SMS credential, an email credential, a voiceprint, an iris scan, a security question, a facial scan, and/or the like.

The rules 126 define actions that may be taken based on the authentication levels. For example, the rules 126 may define if a message will be displayed when a user 102 cannot access that information. The rules 126 may define which users 102 see specific redaction comments when viewing media. The rules 126 may define which groups/users 102 can see what information based on the authentication levels. The rules 126 may define access privileges based on the authentication levels.

The media manager 127 is used to manage access to different sections of the media based on specific authentication levels. For example, the media manager 127 may allow the user 102 to view a specific section of a document 121 or to view sections of a real-time communication session based on what authentication level(s) the user 102 is authenticated to. The media manager 127 may be used to encrypt the media in various ways.

The tokenization table 128 may be a single tokenization table 128 or may comprise multiple tokenization tables 128. For example, there may be multiple individual tokenization tables 128 for each media that has been tokenized. The tokenization table 128 has tokens and the data associated with the tokens. Alternatively, the tokenization table 128 may comprise tokens/data for multiple media types and/or for individual media.

Figure 2:
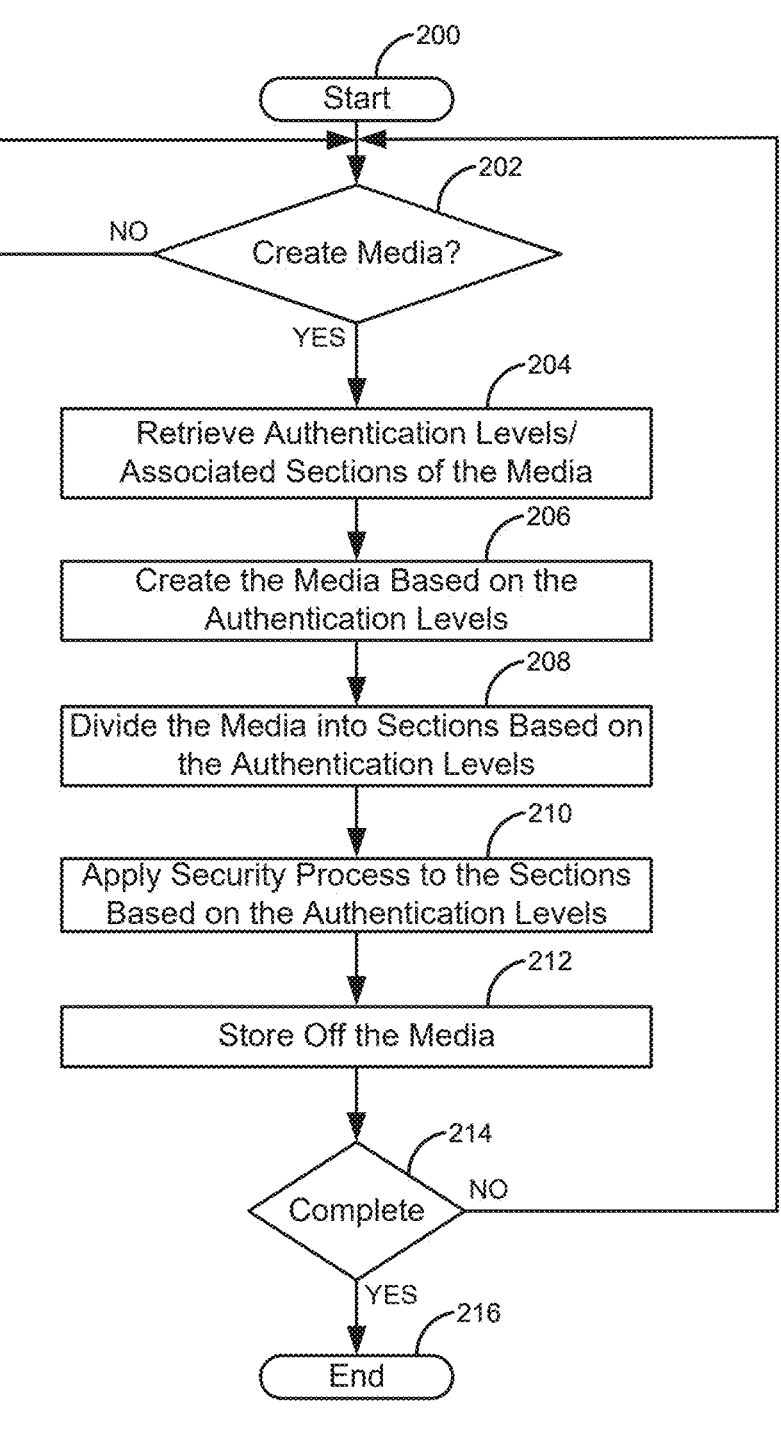
FIG. 2 is a flow diagram of a process for creating media based on authentication levels.

FIG. 2 is a flow diagram of a process for creating media based on authentication levels. Illustratively, the communication devices 101A-101N, the server 120, the email/SMS service 122, the chat service 123, the audio/video mixer 124, the authentication service 125, the rules 126, the media manager 127, and the tokenization table 128 are stored-program-controlled entities, such as a computer or microprocessor, which performs the method of FIGS. 2-7 and the processes described herein by executing program instructions stored in a computer readable storage medium, such as a memory (i.e., a computer memory, a hard disk, and/or the like). Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

The process starts in step 200. The media manager 127, determines, in step 202, if media is to be created. Creating media, in step 202, may comprise modifying an existing media. Creating the media may comprise creating various types of media, such as creating a document 121, creating a web page, creating a real-time communication session, creating an image, and/or the like. If there is no media to create in step 202, the process of step 202 repeats.

Otherwise, if there is media to create in step 202, the media manager 127 retrieves the authentication levels associated with different sections of the media in step 204. For example, the sections may be sections in a document 121, sections in a real-time communication session, different tables in a database, specific text in an image, a type of media (e.g., a video stream is a first section and corresponding audio stream is a second section), objects (e.g., buttons, menus, menu items, panes, and/or the like) on a web page, sections of an image, user names in a video conference, portions of emails, attachments to an email, individual chats in a chat session, SMS messages from individual users 102, sections of a spreadsheet, and/or the like.

Some or all of the sections may have an associated authentication level. For example, three different sections of a document 121 may have three different associated authentication levels: 1) authentication level one, 2) authentication level two, and 3) authentication level three. Based on the authentication levels, the media is created in step 206. The media is divided into the sections based on the authentication levels in step 208.

A security process is applied to the sections based on the authentication levels in step 210. For example, the security process may be to encrypt the three different sections of the document 121 based on the three authentication levels. In this example, section one (associated with the first authentication level) may be encrypted using 128-bit Advanced Encryption Standard (AES), section two (associated with the second authentication level) may be encrypted using Advanced Encryption Standard (AES) 256-bit encryption, and section three (associated with the third authentication level) may be encrypted with Rivest-Shamir-Adleman (RSA) 2048-bit encryption. In this example, there may also be portions of the media that do not have an applied security process. In other words, some sections may be viewed regardless of a user's authentication level. For example, some headers or specific sections may not have an associated security process and can be viewed without the user 102 being authenticated.

In addition, other types of encryption may be used. For example, for text fields or fields of a specific length, format preserving encryption may be used (e.g., where two types/sizes of format preserving encryption keys are used to encrypt different portions of a text field).

The media is then stored off in step 212. In addition to storing off the media, additional metadata may be added/stored off. For example, the metadata associated with the media could indicate what authentication level/encryption key/key size is required to access the media/specific section of the media.

The media manager 127 determines, in step 214, if the process is complete. If the process is not complete in step 214, the process goes to step 202. Otherwise, if the process is complete in step 214, the process ends in step 216.

Figure 3:
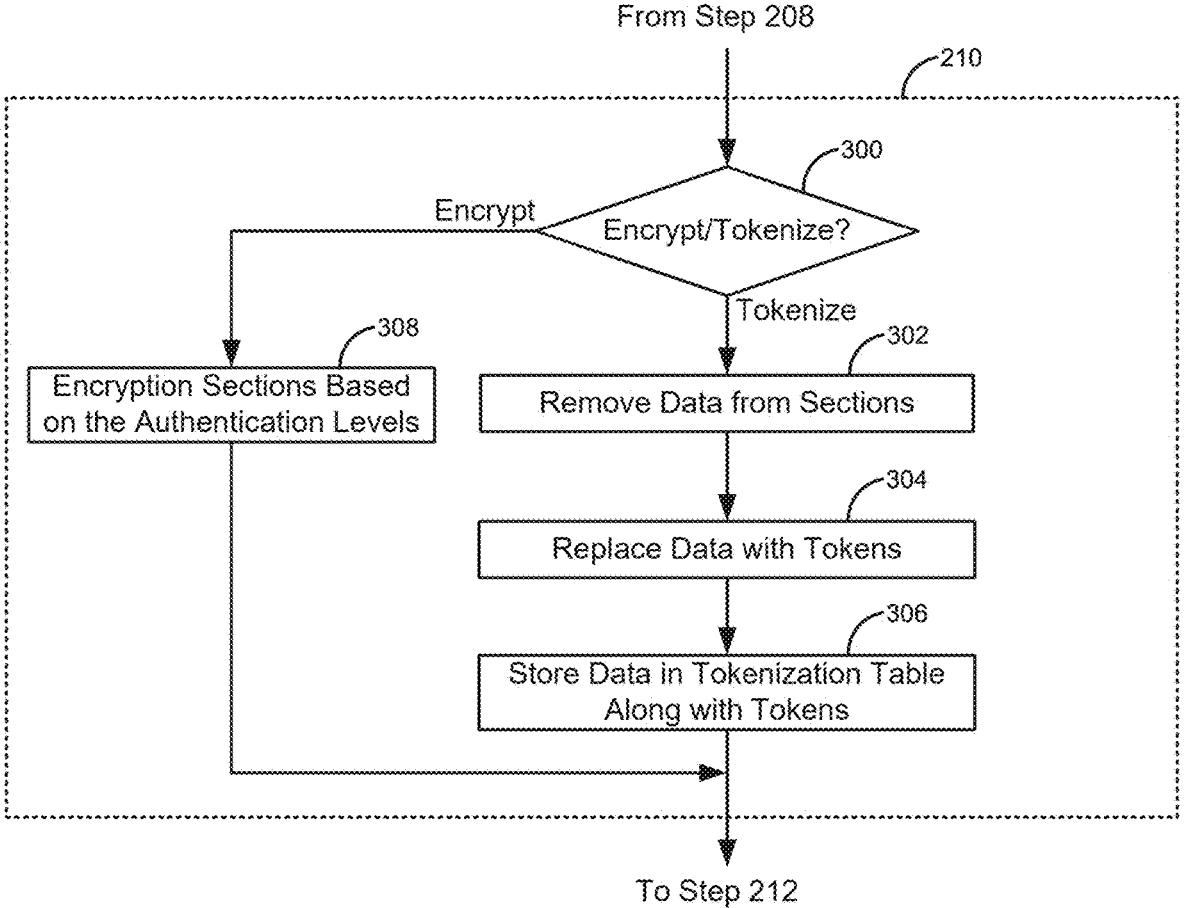
FIG. 3 is a flow diagram of a process for determining whether to encrypt or tokenize media based on authentication levels.

FIG. 3 is a flow diagram of a process for determining whether to encrypt and/or tokenize media based on authentication levels. FIG. 3 is an exemplary embodiment of step 210 of FIG. 2.

After dividing the media into sections in step 208, the media manager 127 determines whether the specific sections associated with the authentication levels is to be encrypted and/or tokenized in step 300. In one embodiment, some sections may be encrypted and some sections may be tokenized. In addition, the tokenized data may be encrypted. For example, the sections in the media may be tokenized and then the data stored in the tokenization table 128 is then encrypted.

If the sections are to be encrypted in step 300, the sections of the media are encrypted according to the rules 126 associated with the authentication levels in step 308. For example, if section one is associated with authentication level one and the rules 126 indicate that section one is to be encrypted using 128-bit AES encryption, then section one is encrypted using 128-bit AES encryption. If section two is associated with authentication level two and the rules 126 indicate that section two is to be encrypted using 256-bit AES encryption, section two is encrypted using 256-bit AES encryption. The encryption process may apply to different sections that are to be encrypted for the same authentication level. For example, section three may also be associated with authentication level two and thus may be encrypted using the 256-bit AES encryption using the same encryption key. The process then goes to step 212.

The underling data may be encrypted using different encryption keys based on the required authentication level. For example, a first portion of video may be encrypted using AES 256-bit encryption and a second portion of the video may be encrypted using RSA 2048-bit encryption for each respective authentication level.

The encryption process could be extended even further to use key fragment encryption (e.g., Macali key fragmentation as described in U.S. Pat. Nos. 6,026,163/5,315,658, which are both incorporated herein in their entirety by reference) where sections are encrypted based on encryption key fragments. In this case, multiple users 102 may be required to authenticate at specific authentication levels in order to encrypt/unencrypt objects/documents 121/sections of media using their encryption key fragments. For example, both user 102A and user 102B may be required to login at authentication level two in order to unencrypt specific documents 121/sections/objects that are being displayed using their respective key fragments. In this example, each user 102A/102B would have enough secondary key fragments that when combined can unencrypt all the unencrypted sections of the document 121/media that were encrypted using the full encryption key.

Otherwise, if the media is to use tokenization in step 300, the data from the sections of the media associated with the authentication levels are removed in step 302 and replaced with tokens in step 304. The data along with the token(s) are stored in a tokenization table 128 in step 306. As discussed above, the data stored in the encryption table 128 may also be encrypted. The process then goes to step 212.

Figure 4:
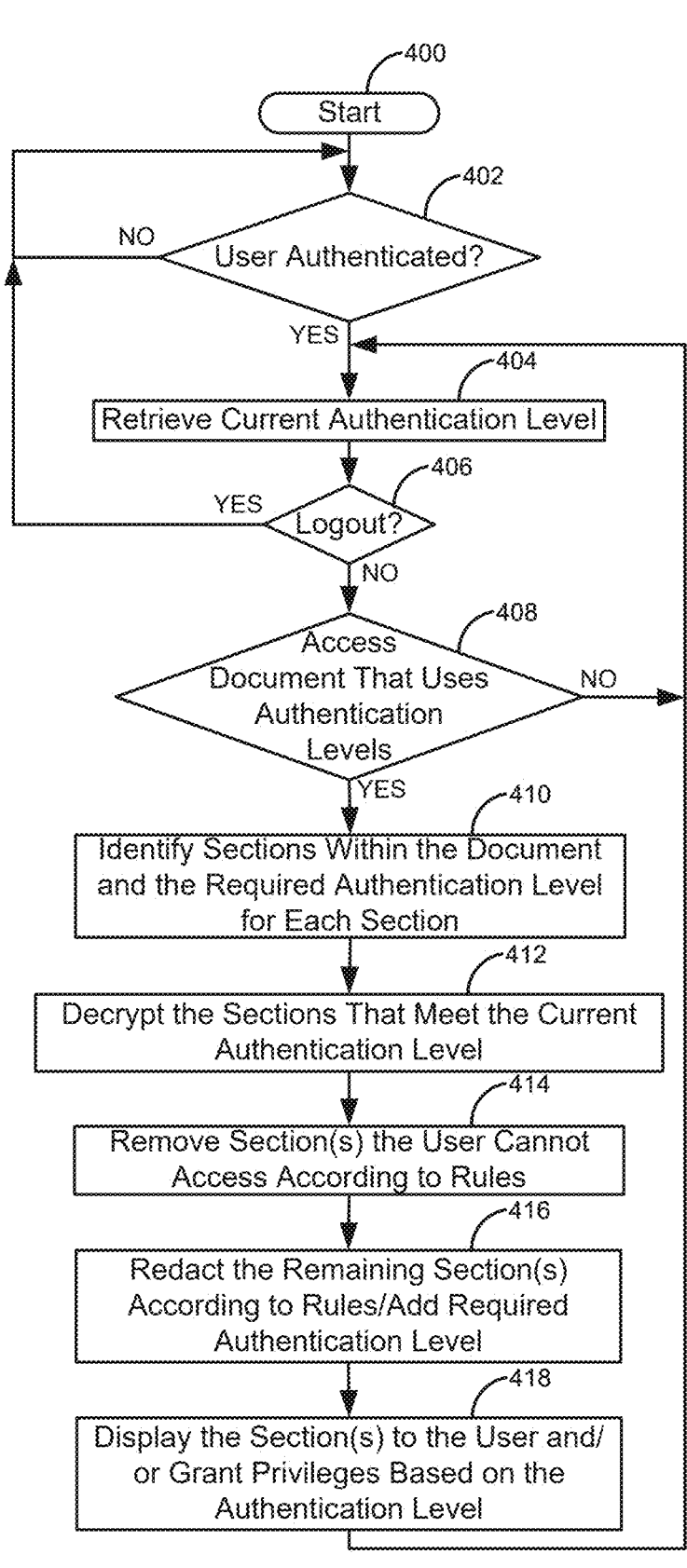
FIG. 4 is a flow diagram of a process for decrypting a media based on authentication levels.

FIG. 4 is a flow diagram of a process for decrypting information a media based on authentication levels. FIG. 4 illustrates an example flow diagram for a document 121. However, the flow of FIG. 1 could apply to other types of media, such as an image, information in a database, a web page, a real-time communication session, and/or the like. In addition, the process of FIG. 4 could use multiple threads to determine the authentication levels of multiple user 102.

The process starts in step 400. The authentication service 125 waits for a user 102 to authenticate in step 402. If the user 102 has not authenticated in step 402, the process of step 402 repeats. Once the user 102 authenticates in step 402, the authentication services 125 retrieves the user's current authentication level in step 404. The media manager 127 determines, in step 406, if the user 102 has logged out. If the user 102 has logged out, the process goes back to step 402 to determine if the user 102 has authenticated again.

Otherwise, if the user 102 has not logged out in step 406, the media manager 127 determines if the user 102 is trying to access a document 121 (a type of media) that uses authentication levels. If the user 102 is not trying to access a document 121/media in step 408, the process goes back to retrieving the current authentication level in step 404.

Otherwise, if the user 102 is trying to access a document 121/media that uses authentication levels, the media manager 127 identifies sections within the document 121/media and the required authentication level for each section in step 410. The sections that meet the current authentication level are then decrypted in step 412 (e.g., using encryption keys/key fragments).

The sections that the user 102 cannot access (e.g., those that require a higher authentication level/different authentication level) are removed according to rules 126 in step 414 and then are redacted according to the rules 126/authentication levels in step 416. This may include placing information in the redaction to tell the user 102 what authentication level is required to see the redacted information. The information in the redaction may also have a button that allows the user 102 to authentication at the authentication level required to un-redact the specific section.

The un-encryption process could also tie in location information. For example, the user 102 may not only have a specific authentication level but must be at a specific location in order to redact/unencrypt/un-tokenize the data.

If the media is a video file and a portion is redacted based on not having the proper authentication level, the video may show what authentication level is required to view the redacted portion. For audio, the audio could say "the next five minutes of audio requires level two authentication to listen to." If the video requires level two authentication and the audio requires level one authentication and the user 102 is authenticated at level one, the audio could play and the video would say that level two authentication is required to view the video portion. In these examples, the user 102 could be automatically prompted to authenticate when the higher authentication level is required.

The redactions could be further limited to specific user's faces, images, names, etc. in a real-time communication session. This would require the audio/video mixer 124 to know the authentication levels and block the video steam/audio stream or portions of the video stream/audio stream in real-time to individual users 102 based on what authentication level each user in the audio/video real-time communication is authenticated at. In this example, each user 102 may be seeing and/or hearing different data specific to their authentication level and privileges.

For example, a user 102 could have an encryption key associated with the login level that is used to unencrypt any level one data being displayed to the user. The user 102 has access to a second encryption key that may be used to unencrypt the data being displayed to the user 102 when logged in at a second (higher) authentication level where the second authentication level requires different/new authentication credentials. For example, the user 102 may need to provide a username/password for authentication level one and a username/password and a fingerprint scan for authentication level two. When the user 102 is logged in at the second authentication level, the user 102 may also have access to the level one authentication encryption key (or may not have access). Each encryption key may be used to unencrypt specific types of sensitive information. The sensitive information may be in specific object(s), the text of specific objects, specific documents 121, specific portions of documents 121 (e.g., specific tables in a spreadsheet, portions of specific tables in a spreadsheet, in links to documents 121 displayed in a web page, partial redacted of displayed objects (e.g., partial redaction of a text field), attachments, emails, records in a database, and/or the like). For example, a first portion of a text field may be encrypted with the level one encryption key and a second portion of the text field may be encrypted using the level two encryption key where each encryption key is associated with a different authentication level. The user 102 can only access/display the full text field when authenticated at level two.

The redaction process could be extended further to include multiple parties. For example, the first user 102A may have multiple encryption keys based on authentication levels. The first user 102A has an encryption key for level one authentication and an encryption key for level two authentication. In this example, the level one encryption key can unencrypt a portion of the object/data/document 121 and the level two encryption key can be used unencrypt a second portion of the object/data/document 121. A second user 102B has the level one, level two, and level three keys to allow the second user 102B to unencrypt the full object/data/document 121 using the three encryption keys.

The authentication level/redaction could be tied to other features, such as, copying information, copy and pasting of information, dragging-and-dropping of documents 121, saving a document 121, editing a document 121, editing a specific portion of a document 121, saving a certain sections of a document 121 based on authentication levels. The authentication levels could be applied to read/write as well. For example, a user 102 may have to authenticate at level one to view a document 121/section and authenticate at level two to edit the document 121/section.

The process could apply to database tables/records. For example, some records in the database table may require different authentication levels. The database records in the database table may be encrypted at different encryption levels/types based on the required authentication level.

The redaction based on authentication levels may be associated with a portion of an image or video. For example, in order to view the faces of people in a real-time video conference call the user 102 will have to have authenticated at level two. The redaction display may have a button that allows the user 102 to authenticate and view what has been redacted.

The sections (decrypted and redacted) are then displayed to the user 102 in step 418. In addition, different privileges may be granted based on the rules 126. For example, the user 102 can only read a section or can only edit the specific section, save the edits, cut-and-paste, and/or the like. The process then repeats by going back to step 404. For example, if the user 102 changes their current authentication level (e.g., authenticating at level two authentication) while accessing the same document 121, the user 102 may now be able to see sections that he/she could not previously view because they were previously redacted.

This process of FIG. 4 can be extended to include video/audio files/real-time communications/SMS/chats etc. For example, different sections of a video and/or audio file may require a different authentication levels. The redaction may be based specific content of the file. In other words, different sections/content may require different authentication levels. The process of FIG. 4 could apply to media like a specific slide in a PowerPoint® presentation that is part of a video or a specific portion of an image in a video. For example, slides 1-4 may require level two authentication while the rest of the PowerPoint presentation may only require authentication level one authentication.

Figure 5:
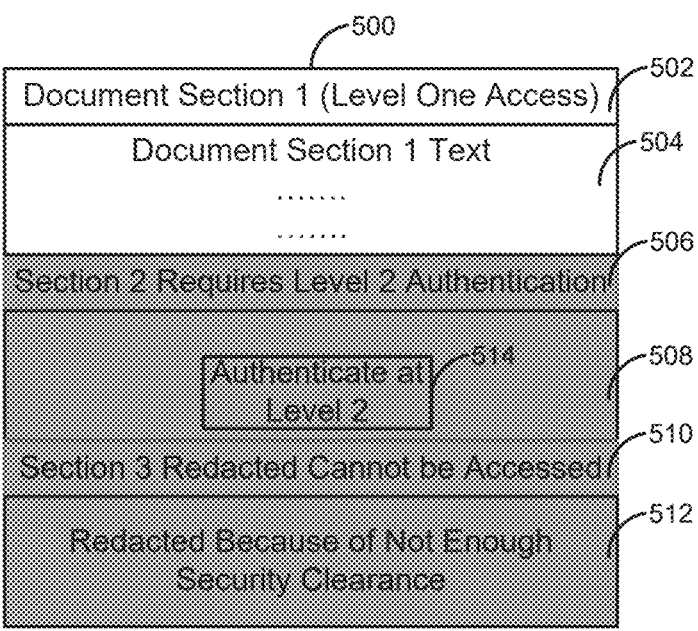
FIG. 5 is a diagram of a media that is displayed to a user based on authentication levels.

FIG. 5 is a diagram 500 of a media that is displayed to a user 102 based on authentication levels. In FIG. 5, the media is a document 121. While FIG. 5 is described using a document 121, the process of FIG. 5 may apply to any type of media. The document 121 has three sections: section 1 (502), section 2 (506), and section 3 (510). Each section 502, 506, and 510 have associated data 504/redacted data 508/512. The data 504 is text data that is shown to the user 102 based on the user's current authentication level (level one). The redacted data 508 includes a button 514 that the user 102 can select to authenticate at the authentication level two in order to view the redacted data 508. The redacted data 512 is also not shown to the user 102. However, this particular user 102 cannot access the redacted data 512 because the user 102 does not have a high enough security clearance. Alternatively, section 3 (510/512) may not even be displayed to the user 102.

The redaction process can be extended further to include access privileges. For example, the section of a document 121 may indicate that the user 102 can only view a section versus view and edit. In this example, the section 1 (502) data may indicate that the user 102 can edit based on level two authentication.

Figure 6:
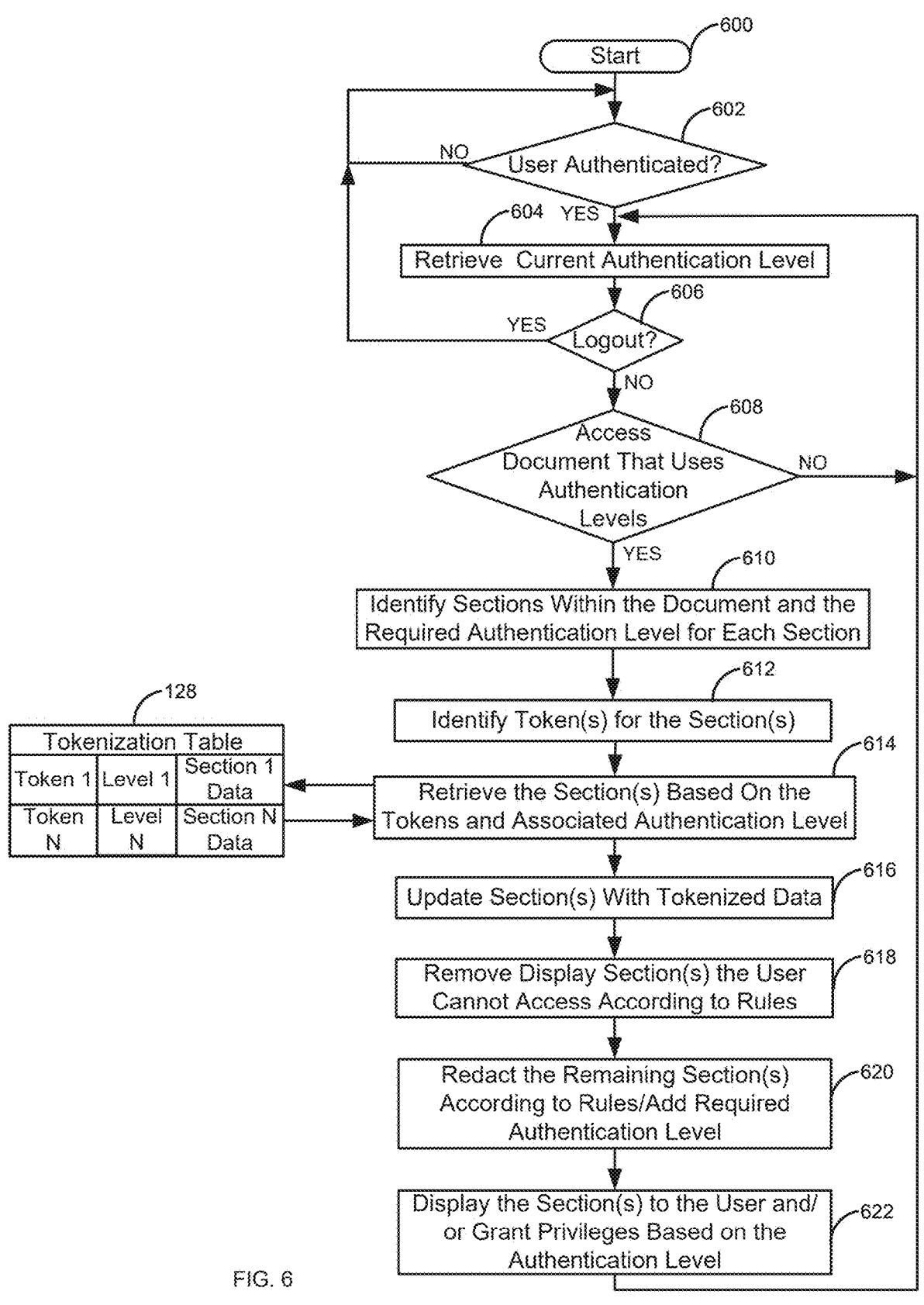
FIG. 6 is a flow diagram of a process for retrieving tokenized data to display information in a media.

FIG. 6 is a flow diagram of a process for retrieving tokenized data to display information in a media. While FIG.

6 is described using a document, the process of FIG. 6 may work for any type of media. The process starts in step 600. The authentication service 125 waits for a user 102 to authenticate in step 602. If the user 102 has not authenticated in step 602, the process of step 602 repeats. Once the user 102 authenticates in step 602, the process retrieves the current authentication level in step 604. The authentication service 125 then determines if the user 102 has logged out in step 606. If the user 102 has logged out in step 606, the process goes back to step 602 to determine if the user 102 has authenticated. Otherwise, if the user 102 has not logged out, in step 606, the media manager 127 determines if the user 102 is trying to access a document 121/media that uses authentication levels. If the user 102 is not trying to access a document 121/media that uses authentication levels in step 608, the process go back to retrieving the current authentication level in step 604.

Otherwise, if the user 102 is trying to access a document 121/media that uses authentication levels in step 608, the process identifies sections within the document 121/media and the required authentication level for each section in step 610. Since the data is tokenized, the sections contain tokens instead of the actual data. The tokens for each section are identified in step 612. The media manager 127 retrieves the data for each section based on the user's current authentication level using the token(s) in the document 121/media to get the data from the tokenization table 128 in step 614. In this example, the tokenization table 128 has a row for each token; the row has the associated authentication level and the section data. If the user's current authentication level matches or is above the current authentication level, the section data is retrieved from the tokenization table 128 in step 614. Otherwise, if the current authentication level is below the token's required authentication level, the data is not retrieved from the tokenization table 128. The section(s) that meet the current authentication level are the updated with the tokenized data in step 616.

The sections that the user 102 cannot access (e.g., those that require a higher authentication level than the user 102 currently has) are removed according to rules 126 in step 618. The remaining section(s) are then redacted according to the rules 126/current authentication level in step 620. This may include placing information in the redaction to tell the user 102 what authentication level is required to see the redacted information.

The sections (those taken from the tokenization table 128 and redacted sections) are then displayed to the user 102 in step 622 (e.g., like shown in FIG. 5). In addition, different privileges may be granted (e.g., the user 102 can only read a section or can also edit the specific section, save the edits, cut-and-paste, etc.). The process then repeats by going back to step 604. For example, if the user 102 changes their current authentication level (e.g., authenticating at level two) while accessing the same document 121, the user 102 may now be able to see sections that he/she could not previously view because they were previously redacted.

Figure 7:
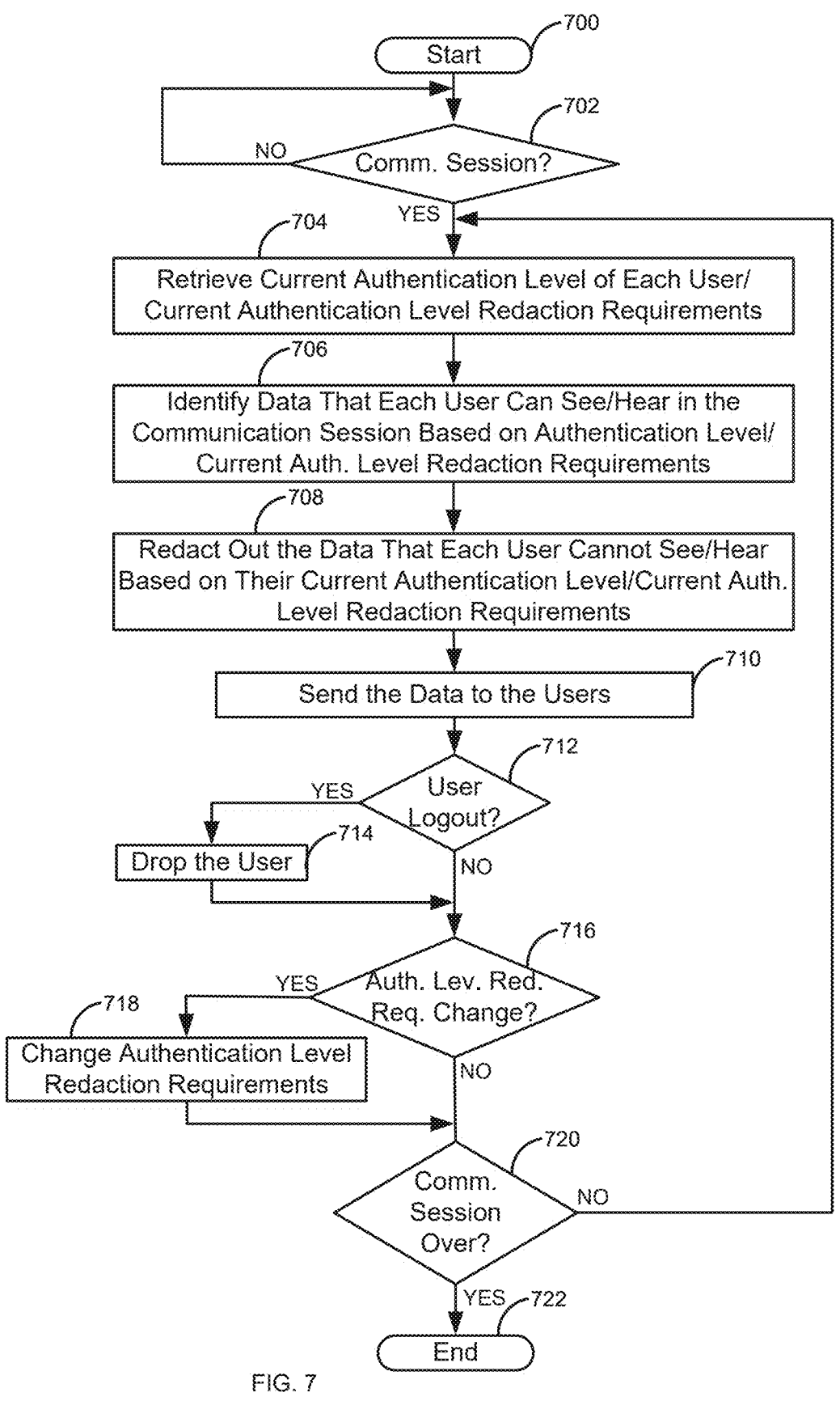
FIG. 7 is a flow diagram of a process for redacting information in a real-time communication session.

FIG. 7 is a flow diagram of a process for redacting information in a real-time communication session. The process starts in step 700. The audio/video mixer 124 waits for a real-time communication session to be established (e.g., a voice communication session or a video conference communication session) in step 702. If a real-time communication session has not been established in step 702, the process of step 702 repeats.

Once the real-time communication session has been established in step 702, the authentication service 125 retrieves the current authentication level of each user 102 in the real-time communication session and the current level redaction requirements stored in the rules 126 in step 704. The level redaction requirements define what each user 102 can see/view with the required authentication level(s). For example, a video communication session may initially only require all parties to be authenticated at level one to hear/view the video communication session. However, a user 102 may change the required authentication level in real-time (e.g., by clicking on a button). For example, the level redaction requirements may now require that a first user 102A be authenticated at authentication level two and the remaining users 102B-102N be authenticated at authentication level three.

The audio/video mixer 124 identifies, in step 706, the data that each user 102 can see/hear based on each user's authentication level and the current authentication level redaction requirements in the rules 126. The audio/video mixer 124 then redacts out the data that each user 102 cannot see/hear based on their current authentication level and the current authentication level redaction requirements in the rules 126 in step 708. The audio/video mixer 124 then sends the data to each of the communication devices 101A-101N, in step 710, based on the user's specific authentication level and the current authentication level redaction requirements in the rules 126.

The authentication service 125 determines, in step 712, if the user 102 has logged out. If a user 102 has logged out of the real-time communication session in step 712, the user 102 is dropped from the real-time communication session in step 714 and the process goes to step 716. Otherwise, if the user 102 has not logged out in step 716, the authentication service 125 determines, in step 716, if the authentication level redaction requirements have changed (e.g., a user 102 changes the authentication level redaction requirements in real-time). If the authentication level redaction requirements have changed during the real-time communication session in step 716, the authentication level redaction requirements are changed for the real-time communication session in step 718 and the process goes to step 720.

Otherwise, if the authentication level requirements have not changed in step 716, the media manager 127 determines if the real-time communication session has ended in step 720. If the real-time communication session has not ended in step 720 the process repeats by going back to step 704. Otherwise, the real-time communication ends in step 722.

The process described in FIG. 7 could apply to a group of members that are part of a text message/chat in real-time. For example, specific messages may require a specific authentication level to view. For a chat session between a group of users 102A-102N, the portions of the chat may be redacted based on a user 102 not having the proper authentication level. For example, all chat messages from user 102A may be redacted from the chat unless all the members of the group are authenticated at level two. Alternatively, if one user (e.g., 102B) is not authenticated at level two, the user 102B will not be able to see the messages from user 102A (in real-time or not), but the rest of the users (e.g., 102N) will be able to see the messages from user 102A. In this example, the user 102B would have to authenticate at level two the see the message from the user 102A. The redacted portion could indicate the required authentication level to see the redacted text. The user 102B may be prompted to authenticate or have an option in the chat to authenticate at the higher authentication level.

The process of using authentication levels could be tied to licensing of a document 121. For example, a document 121 may have multiple passwords to unlock portions of the document 121. The first password unlocks a first portion of the document 121 and a second password unlocks a second portion of the document 121 or all of the document 121. Alternatively, the user 102 may have to provide both passwords to see the whole document 121 or have a third password to view the whole document 121.

The process of authentication levels/encryption/redaction may be part of a Software as a Service (SaaS)/single sign-on system. This may include an authentication service 125 that has the encryption keys what are used to unencrypt the data when the user 102 authenticates. In this example, the encryption keys are part of the authentication service 125. The SaaS single sign-on system may also use tokenization.

In addition, an Artificial Intelligence (AI) model can be trained on sensitive information and then be used to automatically classify media and determine the correct authentication levels/redaction required to access the media. For example, the AI model may learn that links associated with a specific web site should be encrypted using AES 256-bit encryption and require level two authentication for a specific user 102 or group of users 102. Similarly, this process could be applied to documents 121 and/or sections of documents 121 or any of the processes described herein. The AI model may also be used to determine the encryption types/levels for the different types of data based on a training corpus and how data is currently encrypted.

For example, the AI model can be used to classify the media. The classifying of the media may include determining the sections of the media and the associated of authentication levels for the sections of the media. For example, the AI model may learn over time that specific types of sensitive information always require level two authentication and other types of sensitive information always require level one authentication. Thus, the AI model can classify the sections of new media without input from a user 102. Alternatively, feedback from the user 102 may be used to help train the AI model.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:

a microprocessor; and a computer readable memory, coupled with the microprocessor and comprising microprocessor readable and executable instructions that, when executed by the microprocessor, cause the microprocessor to:

create media, wherein the media is associated with a plurality of authentication levels, wherein the media is created based on a security process according to the plurality of authentication levels;

divide the media, during creation of the media, into a plurality of sections, wherein each section of the plurality of sections corresponds to at least one of the plurality of authentication levels; and apply the security process, during creation of the media, to each of the plurality of sections based on a corresponding authentication level, such that different sections of the plurality of sections of the media are subject to different security processes according to their authentication levels, wherein the media is a real-time communication session and wherein the security process removes content in real-time according to which authentication level each member in the real-time communication session is authenticated to, and wherein a first member of the real-time communication session is logged in at a first authentication level, wherein a second member of the real-time communication session is logged in at a second authentication level authentication level, which is higher than the first authentication level, wherein the first member of the real-time communication session cannot see an identity of a third member in the real-time communication session, and wherein the second member of the real-time communication session can see the identity of the third member.

2. The system of claim 1, wherein the security process is encryption and where the plurality of sections are encrypted using a different encryption process and/or different encryption key.

3. The system of claim 1, wherein the real-time communication session is a real-time audio/video communication session, wherein a first member of the real-time audio/video communication session is logged in at a first authentication level, wherein a second member of the real-time audio/video communication session is logged in at a second authentication level authentication level, which is higher than the first authentication level, wherein the first member of the real-time audio/video communication session can only listen to the real-time audio/video communication session, and wherein the second member of the real-time audio/video communication session can listen to the real-time audio/video communication session and view the real-time audio/video communication session.

4. The system of claim 1, wherein the real-time communication session is a real-time audio communication session, wherein a first member of the real-time audio communication session is logged in at a first authentication level, wherein a second member of the real-time audio communication session is logged in at a second authentication level authentication level, which is higher than the first authentication level, wherein the first member of the real-time audio communication session can only listen to a first portion of the real-time audio communication session, and wherein the second member of the real-time audio communication session can listen to all of the real-time audio communication session.

5. The system of claim 4, wherein an announcement is made in the real-time audio communication session to the first member of the real-time audio communication that the first member of the real-time communication session will not be able to listen to a second portion of the real-time audio communication session.

6. The system of claim 1, wherein security process is a tokenization process and wherein the microprocessor readable and executable instructions further cause the microprocessor to:

remove the plurality of sections from the media; and replace the plurality of sections in the media with a plurality of tokens.

7. The system of claim 6, wherein the plurality of tokens are also stored in a tokenization table, wherein the plurality of tokens in the tokenization table reference the removed plurality of sections, and wherein a user can access the removed plurality of sections by providing authentication credentials for the plurality of authentication levels.

8. The system of claim 6, wherein one or more of the removed plurality of sections are redacted in a display based on a user's current authentication level.

9. The system of claim 8, wherein the one or more of the removed plurality of sections that are redacted in the display indicate an authentication level required to display the one or more of the removed plurality of sections.

10. The system of claim 1, wherein the security process is a key fragmentation process that requires a plurality of users to be authenticated at specific authentication levels in order to access one of the plurality sections of the media.

11. The system of claim 1, wherein an Artificial Intelligence (AI) model is used to classify the media and compartmentalize the media into the plurality of sections based on the AI model learning what types of sensitive information is associated with the plurality of authentication levels.

12. A method, comprising:

creating, by a microprocessor, media, wherein the media is associated with a plurality of authentication levels, wherein the media is created based on a security process according to the plurality of authentication levels;

dividing, by the microprocessor, the media, during creation of the media, into a plurality of sections, wherein each section of the plurality of sections corresponds to at least one of the plurality of authentication levels; and applying, by the microprocessor, the security process, during creation of the media, to each of the plurality of sections based on the plurality of authentication levels, such that different sections of the plurality of sections of the media are subject to different security processes according to their authentication levels, wherein the media is a real-time communication session and wherein the security process removes content in real-time according to which authentication level each member in the real-time communication session is authenticated to, and wherein a first member of the real-time communication session is logged in at a first authentication level, wherein a second member of the real-time communication session is logged in at a second authentication level authentication level, which is higher than the first authentication level, wherein the first member of the real-time communication session cannot see an identity of a third member in the real-time communication session, and wherein the second member of the real-time communication session can see the identity of the third member.

13. The method of claim 12, wherein the security process is encryption and where the plurality of sections are encrypted using a different encryption process and/or different encryption key.

14. The method of claim 12, wherein security process is a tokenization process and wherein the microprocessor readable and executable instructions further cause the microprocessor to:

remove the plurality of sections from the media; and replace the plurality of sections in the media with a plurality of tokens.

15. The method of claim 12, wherein the security process is a key fragmentation process that requires a plurality of users to be authenticated at specific authentication levels in order to access one of the plurality sections of the media.

16. A system, comprising:

a microprocessor; and a computer readable memory, coupled with the microprocessor and comprising microprocessor readable and executable instructions that, when executed by the microprocessor, cause the microprocessor to:

retrieve media, wherein the media is associated with a plurality of authentication levels, wherein the media is created based on a security process according to the plurality of authentication levels, wherein the media is divided during creation of the media, into a plurality of sections with each section of the plurality of sections corresponding to at least one of the plurality of authentication levels, wherein the security process is applied during creation of the media to each of the plurality of sections based on a corresponding authentication level, such that different sections of the plurality of sections of the media are subject to different security processes according to their authentication levels, wherein the media is a real-time communication session and wherein the security process removes content in real-time according to which authentication level each member in the real-time communication session is authenticated to, and wherein a first member of the real-time communication session is logged in at a first authentication level, wherein a second member of the real-time communication session is logged in at a second authentication level authentication level, which is higher than the first authentication level, wherein the first member of the real-time communication session cannot see an identity of a third member in the real-time communication session, and wherein the second member of the real-time communication session can see the identity of the third member;

retrieve a current authentication level of the first member;

determine sections of the media that the first member can access based on the current authentication level of the first member;

display the sections of the media that the first member can access based on the current authentication level of the first member; and not display or redact sections of the media that the first member cannot access based the current authentication level of the first member.

17. The system of claim 16, wherein the security process is encryption and where the plurality of sections are encrypted using a different encryption process and/or different encryption key.

18. The system of claim 16, wherein security process is a tokenization process and wherein the microprocessor readable and executable instructions further cause the microprocessor to:

remove the plurality of sections from the media; and replace the plurality of sections in the media with a plurality of tokens.

19. The system of claim 16, wherein the security process is a key fragmentation process that requires a plurality of users to be authenticated at specific authentication levels in order to access one of the plurality sections of the media.

20. The system of claim 16, wherein an Artificial Intelligence (AI) model is used to classify the media and compartmentalize the media into the plurality of sections based on the AI model learning what types of sensitive information is associated with the plurality of authentication levels.

* * * * *